(12) United States Patent
Kucmerowski et al.

(10) Patent No.: US 6,728,339 B2
(45) Date of Patent: Apr. 27, 2004

(54) APPARATUS AND METHOD FOR E911 DETECTION AND CALLBACK MONITORING

(75) Inventors: Dennis L. Kucmerowski, Delray Beach, FL (US); David Vander Meiden, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 61 days.

(21) Appl. No.: 10/222,183

(22) Filed: Aug. 16, 2002

(65) Prior Publication Data

US 2004/0032932 A1 Feb. 19, 2004

(51) Int. Cl.[7] .............................................. H04M 11/00
(52) U.S. Cl. ........................ 379/45; 379/37; 379/102.01
(58) Field of Search ........................ 379/37–51, 102.01, 379/102.02, 102.07

(56) References Cited

U.S. PATENT DOCUMENTS

| | | | | |
|---|---|---|---|---|
| 4,760,593 A | * | 7/1988 | Shapiro et al. | 379/38 |
| 5,305,370 A | * | 4/1994 | Kearns et al. | 379/45 |
| 5,333,171 A | * | 7/1994 | Wang et al. | 379/37 |
| 5,475,745 A | * | 12/1995 | Boyle | 379/45 |
| 6,567,502 B2 | * | 5/2003 | Zellner et al. | 379/45 |

* cited by examiner

Primary Examiner—Wing Fu Chan (57) ABSTRACT

In an enhanced 911 (E911) response system, a callback monitor including a microphone and a speaker is connected to a telephone. When a caller dials 911 from the telephone, upon the telephone going on-hook, the callback monitor is activated to allow a 911 operator who calls back to detect sounds from the location of the caller's telephone without that phone ringing or being taken off hook. The callback monitor includes a timer; when the timer expires, the monitoring ends. In alternative embodiments, the timer can be extended.

20 Claims, 7 Drawing Sheets

APPARATUS AND METHOD FOR E911 DETECTION AND CALLBACK MONITORING

FIELD OF THE INVENTION

The invention is used in conjunction with Enhanced 911 (E911) for emergency situations.

BACKGROUND OF THE INVENTION

A universal emergency number such as 911 has vastly improved emergency services. A caller in trouble can dial a single, easy-to-remember, easy-to-dial number to reach a central operator who can dispatch the needed service, such as police, fire, or ambulance. Enhanced 911 uses special computers and display screens, and selective routing and call transfer to identify the caller's location and telephone number and to provide services more efficiently.

In many instances, a 911 caller hangs up before all relevant information is conveyed to the 911 operator. Sometimes this is because the caller is flustered or disoriented; sometimes an intruder or an emergency situation forces the caller to hang up. Often the operator has insufficient information to respond adequately to the situation. The operator can call back, but if the original caller is unable to answer the phone, the questions go unanswered. The operator then must guess as to what services are needed. What is needed is a way for a 911 operator to get more information from an emergency caller who has hung up.

SUMMARY OF THE INVENTION

The present invention allows a 911 operator to call back a telephone that has laced a 911 call without ringing the caller's telephone, and silently to monitor a potentially hazardous situation. The invention also allows the 911 facility to communicate instructions and to receive information from a hands-free caller who need to take the telephone off hook.

DETAILED DESCRIPTION OF PREFERRED EMBODIMENTS

Figure 1:
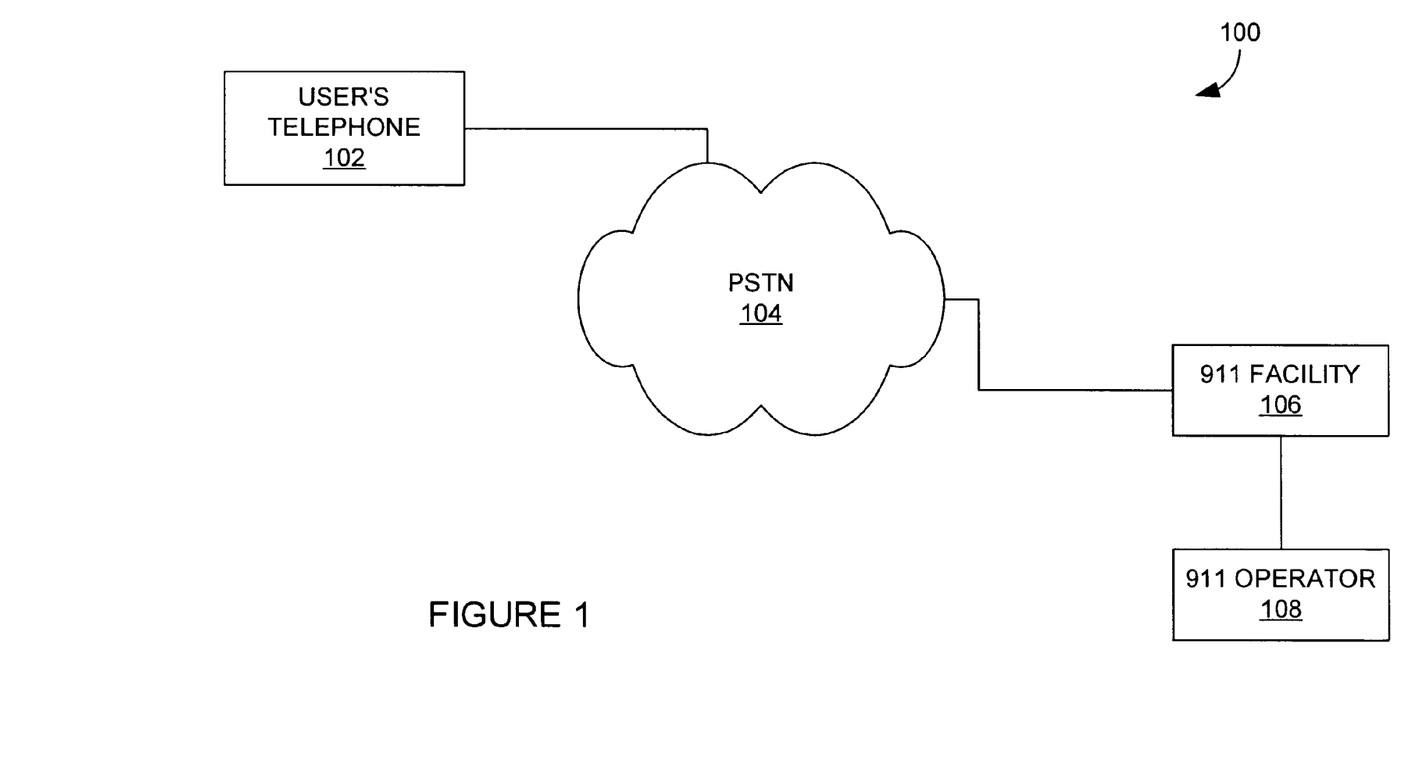
FIG. 1 is a schematic depiction of a 911 system of the background art.

A 911 emergency response system 100 according to the background art is shown in FIG. 1. A user's telephone 102 is connected to the public switched telephone network 104. A 911 facility 106 connects to PSTN 104. A 911 operator 108 handles calls to the 911 facility and dispatches appropriate emergency aid.

Figure 2:
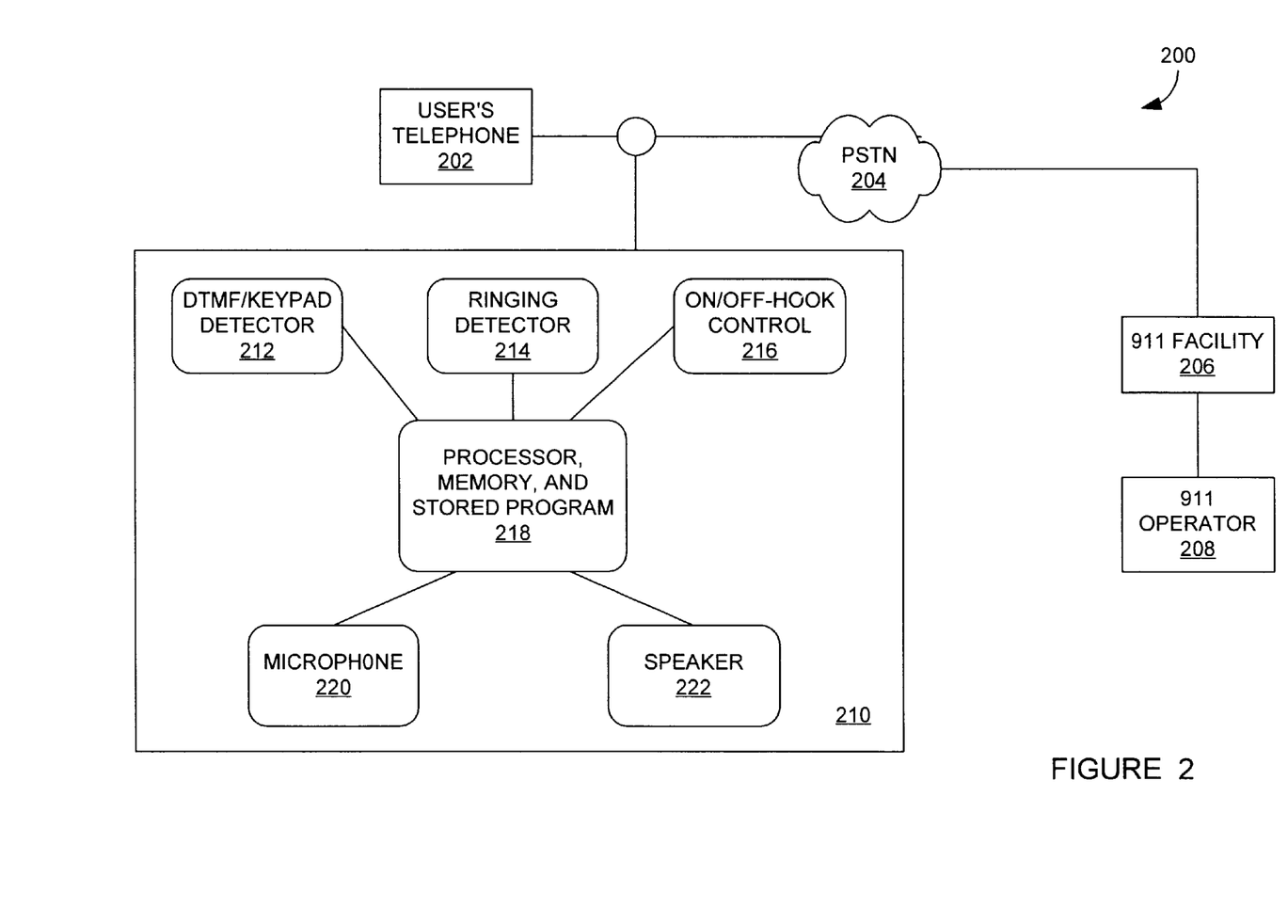
FIG. 2 is a schematic depiction of a 911 system in accordance with the present invention.

A 911 emergency response system 200 according to the present invention is depicted in FIG. 2. A user's telephone is again connected to PSTN 204, which in turn connects to a 911 facility 206 and a 911 operator 208.

System 200 also includes a callback monitor 210 that allows a callback from 911 to be intercepted and answered automatically and immediately without ringing the user's telephone 202. Upon callback monitor 210 automatically answering, a speaker and microphone can be activated to allow the 911 operator to silently monitor the user's environment or to monitor and communicate with the user. Callback monitor 210 is depicted in FIG. 2 as an independent device; as those skilled in the art would know, all components of callback monitor 210 can be integrated into a telephone's control circuit so that all functions are implemented in a telephone.

Callback monitor 210 includes a DTMF detector 212. DTMF detector 212 detects when 911 is being called. Detection of a 911 call can alternatively be implemented by a keypad detector that detects when the 911 key sequence is pressed.

Callback monitor 210 further includes a ring detector 214, an on-hook and off-hook control 216, a processor 218 including memory and at least one stored program, a microphone 220 and a speaker 222. (Alternatively, monitor 210 includes a microphone but not a speaker.) When 911 is dialed on a user's telephone 202, monitor 210 detects that an emergency call has been placed, using a DTMF/keypad detector 212. The monitor is activated such that if the user's telephone goes on-hook and the E911 operator places a return call, processor 218 (including memory and stored program) instructs the monitor 210 to intercept the return call. (If the emergency facility has answered the call, a return call typically need not be placed; the system can allow the emergency operator to stay on.) On/off-hook control 216 answers the call before the telephone rings. Upon automatic answering, a microphone 220 is activated in order to monitor the surrounding environment. In an alternative embodiment, microphone 220 and speaker 222 are both activated so that 911 operator 208 can communicate with and monitor the user's surrounding environment.

Figure 3:
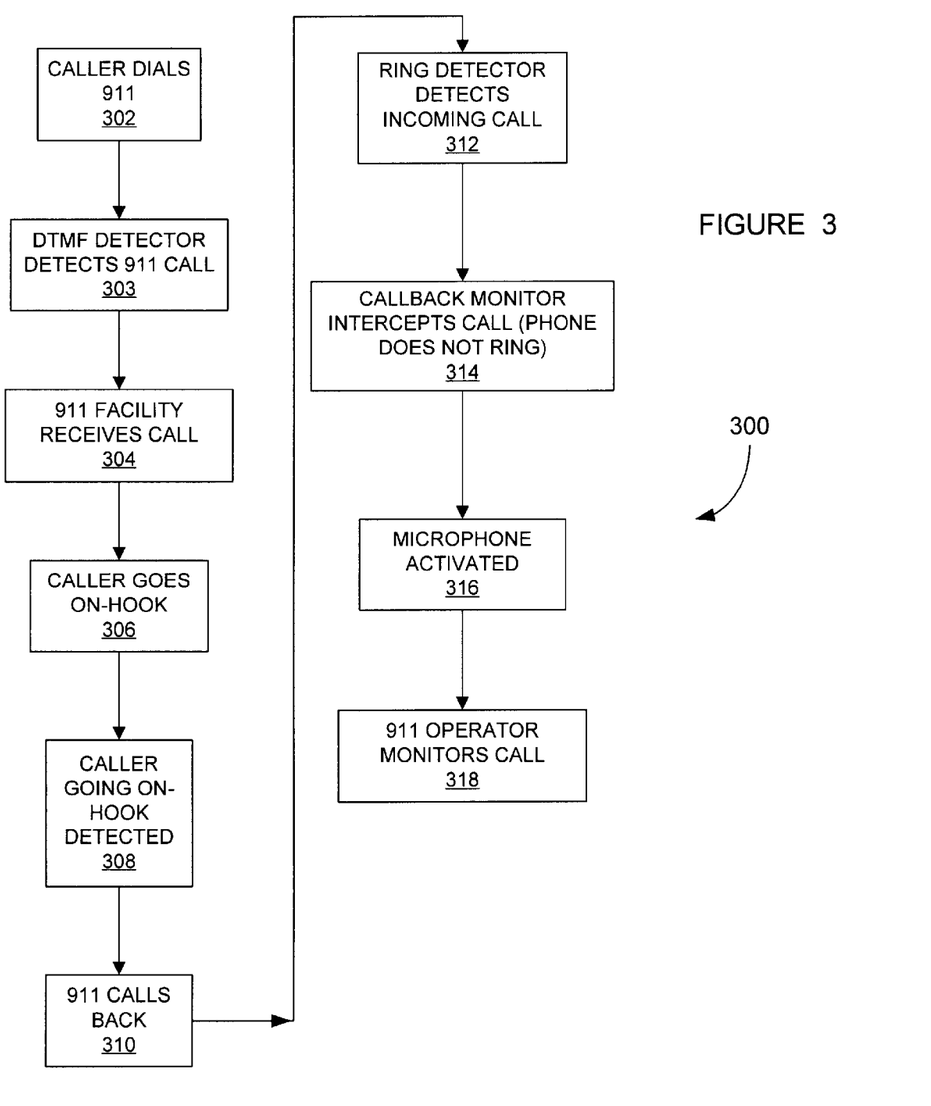
FIG. 3 is a flow chart of a method of the invention.

A method 300 in accordance with the present invention is illustrated in FIG. 3. A caller dials 911, at step 302. At step 303, a DTMF/keypad detector associated with the callback monitor detects that an emergency call has been placed. A 911 facility (such as an E911 facility) receives the call at step 304. The 911 facility captures the calling number so that the call back can be conducted by the 911 operator if the caller hangs up. The caller goes on-hook, at step 306.

At step 308, the 911 facility detects the caller going on hook. Upon detecting the subject telephone going on hook, the 911 facility initiates a call back to the subject telephone, at a step 310.

In alternative embodiments, the caller can register his number with the monitor, so the number to be called back can be stored in a table and looked up and then transmitted to the 911 facility. In another alternative embodiment, the caller can push a key that enables the monitor 210 to transmit the callback number to the 911 facility.

At a step 312, a ring detector associated with the callback monitor detects the incoming call from 911. At a step 314, the callback monitor intercepts the call before the telephone rings.

At step 316, the callback monitor activates a microphone associated with the user's calling telephone. In an alternative embodiment, at step 316, both the microphone and speaker are activated. The 911 operator or other personnel monitors the callback. The microphone and speaker are activated without notifying the subject premises so that emergency personnel can monitor the call at step 318 without alerting people around the subject telephone.

Figure 4:
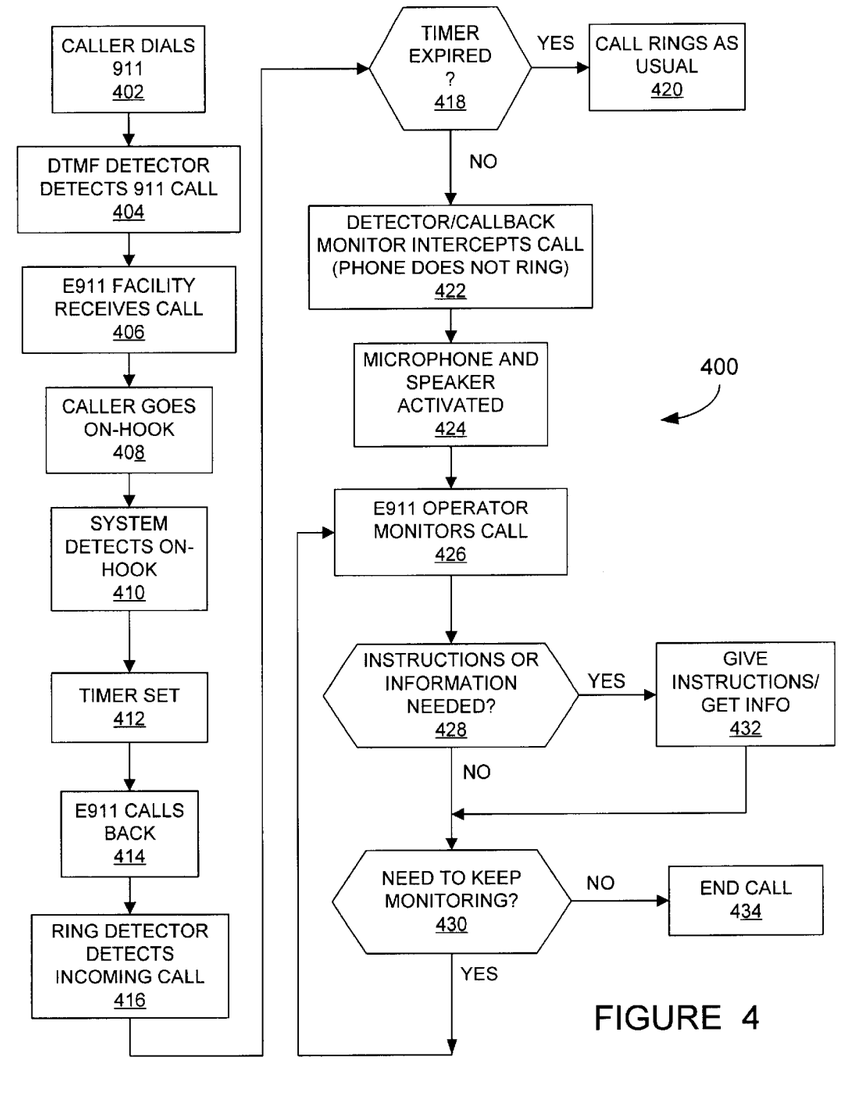
FIG. 4 is a more detailed flow chart of a method of the invention.

A more detailed method 400 in accordance with the present invention is illustrated in FIG. 4. At step 402, a caller dials 911. At step 404, a dual-tone multifrequency (DTMF) detector detects that the 911 call has been placed by detecting the dialing of the digits. At step 406, the Enhanced 911 (E911) facility receives the call. As is conventional, the E911 facility captures the calling party number and other information, such as location, of the calling party. At step 408, the caller goes on hook. The system detects the caller going on hook, at step 410.

A timer is set, at step 412. In alternative embodiments, the timer can be set at the time the detector detects the digits or when the E911 facility receives the call. At step 414, the E911 facility calls the caller back. The ring detector detects the incoming call, at step 416. Step 418 checks if the timer has expired. If so, the call rings as usual, at step 420. (In one alternative embodiment, the user can choose to extend or reduce the timer to suit the user's environment.)

If the timer has not expired, the method then proceeds to step 422, where the monitor intercepts the call so that the phone does not ring. At step 424, the microphone and speaker are activated. (In an alternative embodiment, at step 424 only the microphone is activated.) The E911 operator silently monitors the call at step 426. At step 428, the operator checks whether she needs to give information to the subscriber and whether the subscriber needs to give information to the E911 operator. If no, the method continues to step 430. If yes, the information is verbally communicated using the speaker and microphone, at step 432. The method then proceeds to step 430, and the operator checks whether continued monitoring is necessary. If no, the operator releases the call and the method ends, at step 434. If there is a need to continue monitoring, the method returns to step 426, and the E911 operator continues to monitor the call.

Figure 5:
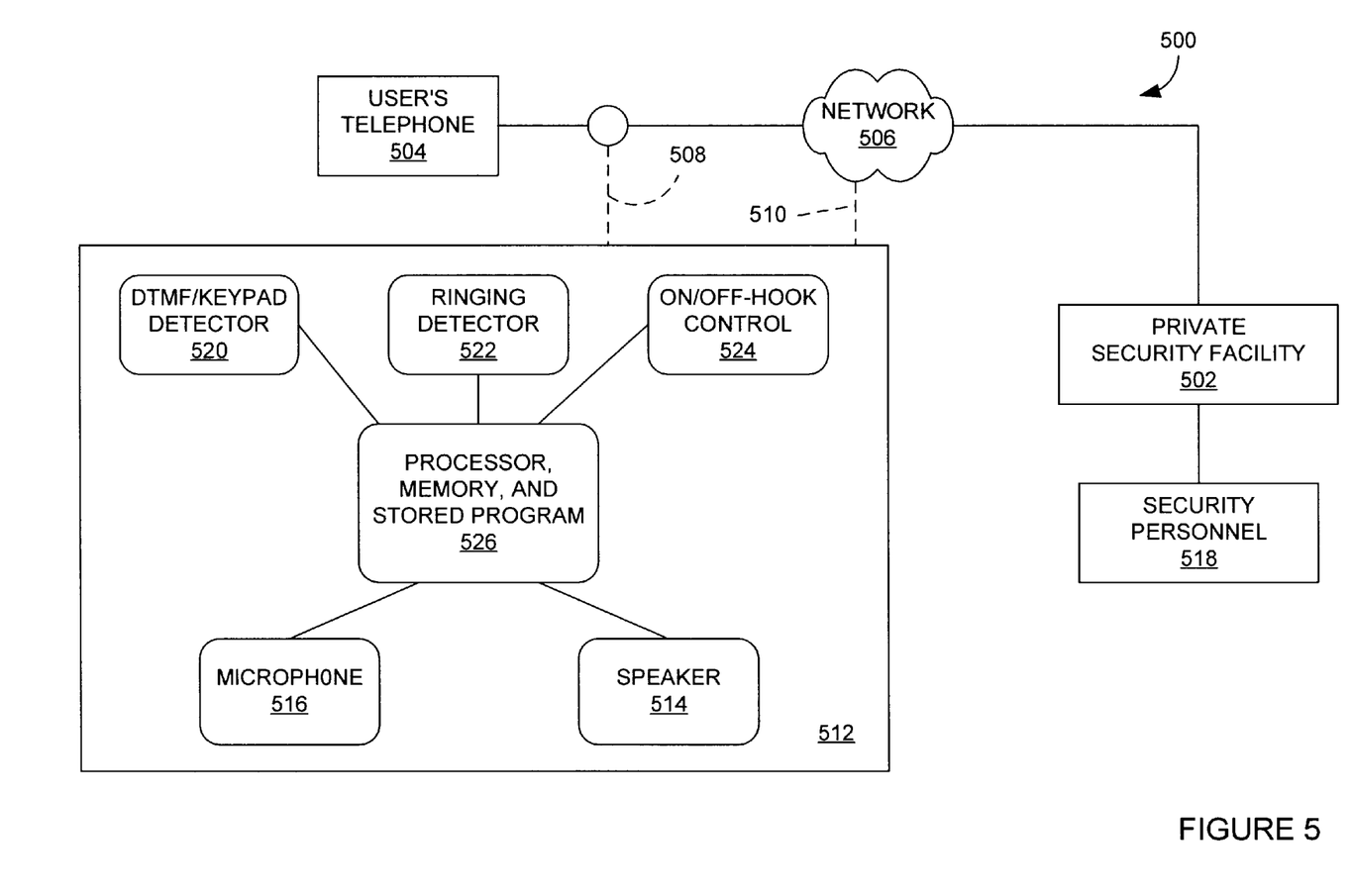
FIG. 5 is a schematic depiction of a private security system in accordance with the present invention.

A response system 500 implemented via a private security facility 502 according to the present invention is depicted in FIG. 5. A user's telephone 504 is connected to a network 506; network 506 can be a PBX or another network, such as the public switched telephone network (PSTN). In a pathway 508, the PBX or other network implements the monitoring function. In an alternative pathway 510, the function is implemented local to the telephone. Because pathways 508 and 510 are alternatives, they are shown by dashed lines.

System 500 also includes a callback monitor 512 that allows a callback from the private security facility 502 to be intercepted and answered automatically and immediately without ringing the user's telephone 504. A private security facility can be, for example, a security office at an industrial complex or a private security or alarm service. Because the telephone number of the private security facility is variable (unlike 911 ), the number must be registered in the callback monitor 512 in order for monitoring to take place. Upon callback monitor 512 automatically answering, a speaker 514 and a microphone 516 can be activated to allow security personnel 518 to silently monitor the user's environment or to monitor and communicate with the user. Callback monitor 512 is depicted in FIG. 5 as an independent device; as those skilled in the art would know, all components of callback monitor 512 can be integrated into a telephone's control circuit or by a PBX so that all functions are implemented in a telephone.

Callback monitor 512 includes a DTMF detector 520. DTMF detector 520 detects when the number of the private security facility is being called. Detection can alternatively be implemented by a keypad detector that detects when a predetermined key sequence is pressed.

Callback monitor 512 further includes a ring detector 522, an on-hook and off-hook control 524, and a processor 526 including memory and at least one stored program. When user's telephone 504 dials the private security facility number, monitor 512 detects that an emergency call has been placed, using DTMF/keypad detector 520. The monitor is activated such that if the user's telephone goes on hook and the security personnel places a return call, processor 526 (including memory and stored program) instructs the monitor 512 to intercept the return call. (If the emergency facility has answered the call, in an alternative embodiment, a return call need not be placed; the system can allow the security personnel to stay on.) On/off-hook control 524 answers the call before the telephone rings. Upon automatic answering, microphone 516 is activated in order to monitor the surrounding environment. In an alternative embodiment, microphone 516 and speaker 514 are both activated so that security personnel 518 can communicate with and monitor the user's surrounding environment.

In an alternative embodiment, network 506 is a PBX that implements the monitoring via programs stored at the PBX. The PBX can control a standalone device through telephone circuitry, or can implement the monitoring through the microphone and speaker in a typical telephone speakerphone.

Figure 6:
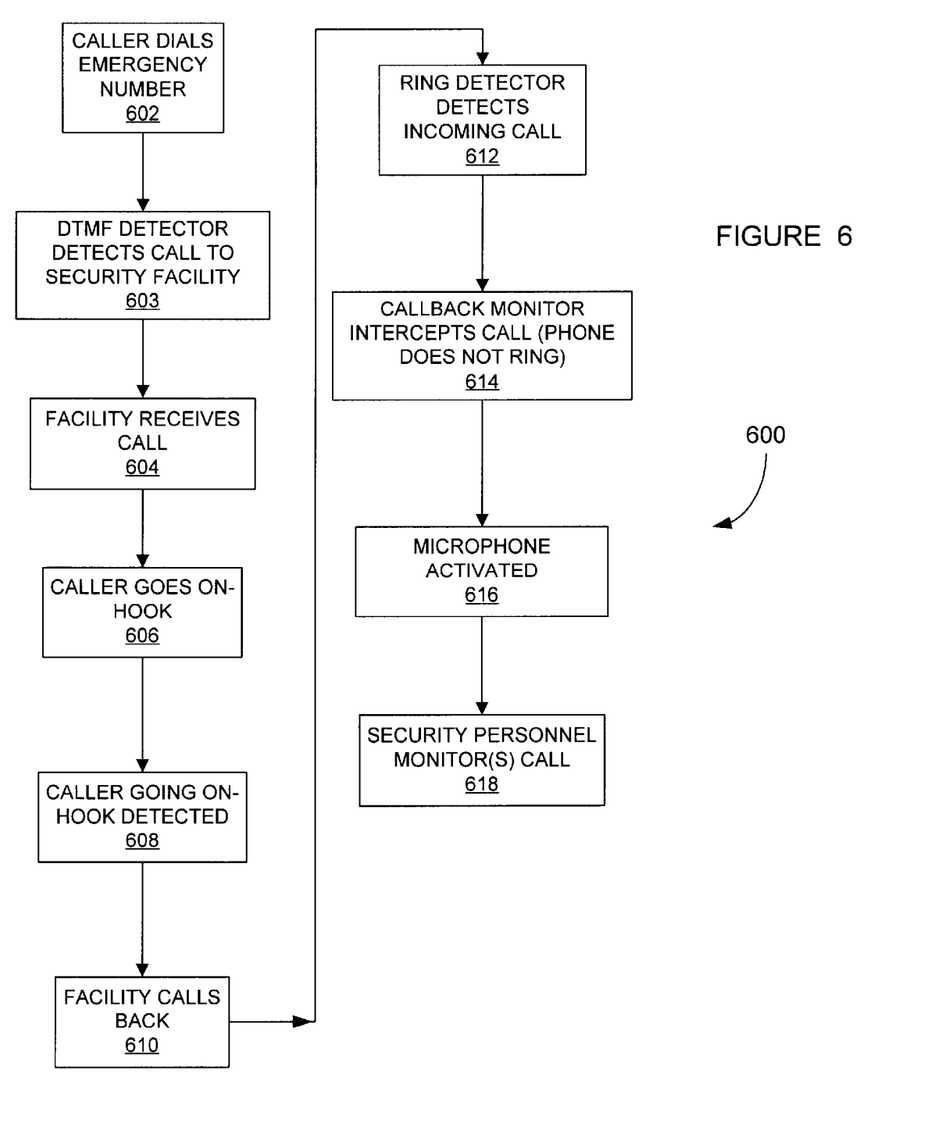
FIG. 6 is a flow chart of a method of the invention as implemented in a private security system.

A method 600 in accordance with the present invention is illustrated in FIG. 6. A caller dials an emergency number, at step 602. At step 603, a DTMF/keypad detector associated with the callback monitor detects that a call to the private security facility has been placed. The private security facility number can also be a dedicated button on a telephone. A private security facility (such as a security office) receives the call at step 604. The private security facility captures the calling number so that a call back can be conducted by the security personnel if the caller hangs up. The caller goes on-hook, at step 606.

At step 608, the private security facility detects the caller going on hook. Upon detecting the subject telephone going on hook, the security facility initiates a call back to the subject telephone, at a step 610.

The call back can be conducted by several means. In one embodiment, the security facility captures the calling number. In alternative embodiments, the PBX records the extension number of a call as it is placed. The PBX can then activate monitoring functions at the location of the telephone extension that originally placed the call.

At a step 612, a ring detector associated with the callback monitor detects the incoming call from the security facility. At a step 614, the callback monitor intercepts the call before the telephone rings.

At step 616, the callback monitor activates a microphone associated with the user's calling telephone. In an alternative embodiment, at step 616, both the microphone and speaker are activated. The security personnel monitors the callback at step 618. The microphone and speaker are activated without notifying the subject premises so that emergency personnel can monitor the call without alerting people around the subject telephone.

Figure 7:
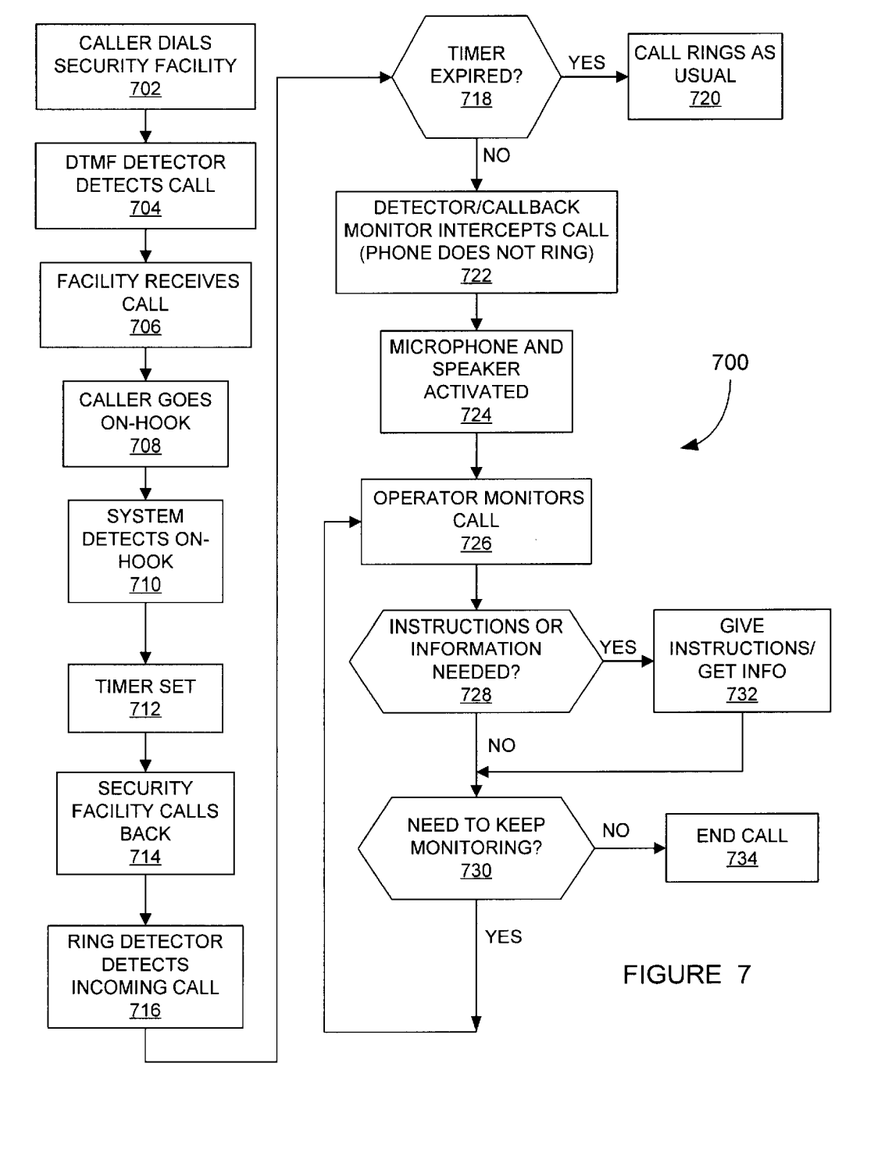
FIG. 7 is a more detailed flow chart of the method of FIG. 6.

A more detailed method 700 for use with a private security facility in accordance with the present invention is illustrated in FIG. 7. At step 702, a caller dials an emergency call to the private security facility. The private security facility can be, for example, a security office at a business or an off-site security firm. Typically, emergency calls will have a different telephone number from routine calls. At step 704, a dual-tone multifrequency (DTMF) detector detects that the emergency call has been placed by detecting the dialing of the digits. At step 706, the security facility receives the call. The security facility captures the calling party number. The facility can capture other information, such as location, of the calling party. At step 708, the caller goes on hook. The system detects the caller going on hook, at step 710.

A timer is set, at step 712. In alternative embodiments, the timer can be set at the time the detector detects the digits or when the security facility receives the call. At step 714, the security facility calls the caller back. The ring detector detects the incoming call, at step 716. Step 718 checks if the timer has expired. If so, the call rings as usual, at step 720. (In one alternative embodiment, the user can choose to extend or reduce the timer to suit the user's environment.)

If the timer has not expired, the method then proceeds to step 722, where the monitor intercepts the call so that the phone does not ring. At step 724, the microphone and speaker are activated. (In an alternative embodiment, at step 724 only the microphone is activated.) An operator or other personnel at the security facility silently monitors the call at step 726. At step 728, the operator checks whether she needs to give information to the subscriber and whether the subscriber needs to give information to the operator. If no, the method continues to step 730. If yes, the information is verbally communicated using the speaker and microphone, at step 732. The method then proceeds to step 730, and the operator checks whether continued monitoring is necessary. If no, the operator releases the call and the method ends, at step 734. If there is a need to continue monitoring, the method returns to step 726, and the operator continues to monitor the call.

The apparatus and method are not limited to those described. The system can be used with other monitoring devices. The system need not be a particular type of 911 system, enhanced 911 system, or private security system; the system can be implemented using a wireless or cellular network, or any other system capable of implementing the method.

Those skilled in the art will be aware of numerous variations within the bounds of the invention, the scope of which is limited only by the following claims.

What is claimed is:

1. In an emergency response system, an apparatus for monitoring a caller comprising:
    a telephone line;
    a callback monitor operably connected to the telephone line, said callback monitor including a microphone and enabling personnel of the emergency response system to detect sounds at the location of a telephone operably connected to the telephone line when the telephone is on hook.

2. The emergency response system of claim 1 wherein the system is a 911 system.

3. The emergency response system of claim 1 wherein the system is a private security facility.

4. The emergency response system of claim 2 wherein the 911 system includes computer capabilities.

5. The emergency response system of claim 1 wherein the personnel includes an operator.

6. The emergency response system of claim 1 wherein the monitor includes a speaker so that the security personnel can be heard at the location of the telephone while the telephone is on hook.

7. The emergency response system of claim 1 wherein a timer times out the monitoring.

8. The emergency response system of claim 7 wherein the caller can choose to adjust the monitoring timer.

9. The emergency response system of claim 1 wherein the system includes a wireless connection.

10. The system of claim 3 wherein the telephone number of the private security facility must be registered in the monitor in order for the monitoring to take place.

11. The system of claim 1 wherein the monitoring occurs after a call back from the emergency response personnel.

12. The system of claim 11 wherein the call back is intercepted so that it does not ring at the telephone.

13. The system of claim 8 wherein the adjustment of the timer is an extension of the monitoring interval.

14. The system of claim 8 wherein the adjustment of the timer is a reduction of the monitoring interval.

15. A method for operating an emergency response system comprising the following steps:
    a caller calling an emergency facility from a telephone by dialing a predetermined emergency number;
    the emergency facility receiving the call;
    the caller going on-hook;
    a callback monitor setting a timer that determines how long to monitor for a call back;
    the emergency facility calling back;
    the callback monitor monitoring whether the timer has expired;
    if the timer has expired, the call ringing as usual;
    if the timer has not expired, a ring detector at the callback monitor detecting the incoming call back from the emergency facility and proceeding with the following substeps;
    the callback monitor intercepting the incoming call back;
    the callback monitor activating a microphone at the telephone; and
    personnel from the emergency facility monitoring the call.

16. The method of claim 15 wherein the emergency facility is a 911 facility.

17. The method of claim 15 wherein the emergency facility is an enhanced 911 facility.

18. The method of claim 15 wherein the intercepted call back does not ring the telephone.

19. A method for operating a 911 emergency response system comprising the following steps:
    a caller calling an emergency facility by dialing 911 from a telephone;
    a DTMF detector of the callback monitor at the caller's telephone detecting the 911 call;
    the facility receiving the caller's 911 call;
    the caller going on-hook;
    the callback monitor setting a timer that determines how long to monitor for a call back;
    the 911 facility calling back;
    the callback monitor monitoring whether the timer has expired;
    if the timer has not expired, a ring detector of the callback monitor detecting the
    call and proceeding with the following substeps:
        the callback monitor intercepting the call without the telephone ringing;
        the callback monitor activating a microphone and speaker of the callback monitor; and
        the 911 operator monitoring the call;
    and if the timer has expired, the call ringing as usual.

20. The method of claim 19 further including the step, before the call ringing step, of the user selecting to adjust the time on the timer.

* * * * *